US010068469B2

(12) United States Patent
Bradley et al.

(10) Patent No.: US 10,068,469 B2
(45) Date of Patent: Sep. 4, 2018

(54) PRECISION TRAFFIC INDICATION

(71) Applicant: HERE Global B.V., Eindhoven (NL)

(72) Inventors: Corinne Bradley, Chicago, IL (US); James Adeyemi Fowe, Evanston, IL (US); Kyle Jackson, Chicago, IL (US); Gavril Giurgiu, Chicago, IL (US); Mitchell McCuiston, Naperville, IL (US); Leon Oliver Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/600,947

(22) Filed: May 22, 2017

(65) Prior Publication Data

US 2017/0256163 A1 Sep. 7, 2017

Related U.S. Application Data

(63) Continuation of application No. 14/159,167, filed on Jan. 20, 2014, now Pat. No. 9,697,731.

(51) Int. Cl.

| | |
|---|---|
| ***G08G 1/00*** | (2006.01) |
| ***G08G 1/01*** | (2006.01) |
| ***G06F 19/00*** | (2018.01) |

(52) U.S. Cl.

CPC ......... *G08G 1/0141* (2013.01); *G08G 1/0112* (2013.01); *G08G 1/0133* (2013.01)

(58) Field of Classification Search

None

See application file for complete search history.

(56) References Cited

U.S. PATENT DOCUMENTS

| | | | |
|---|---|---|---|
| 5,696,502 | A | 12/1997 | Busch et al. |
| 6,466,862 | B1 | 10/2002 | DeKock et al. |
| 6,594,576 | B2 | 7/2003 | Fan et al. |
| 6,810,321 | B1 | 10/2004 | Cook |
| 6,813,555 | B1 | 11/2004 | Kerner |
| 6,861,960 | B2 | 3/2005 | Hessing et al. |
| 7,587,186 | B2 | 9/2009 | Duckeck |
| 7,657,367 | B1 | 2/2010 | Phuyal et al. |
| 7,865,304 | B2 | 1/2011 | Gretton et al. |
| 8,024,110 | B2 | 9/2011 | Fushiki et al. |
| 8,620,568 | B2 | 12/2013 | Shirahatti et al. |
| 2002/0045985 | A1 | 4/2002 | Kerner |
| 2004/0039516 | A1 | 2/2004 | Willembrock |
| 2005/0222751 | A1 | 10/2005 | Uyeki |
| 2007/0208492 | A1 | 9/2007 | Downs et al. |

(Continued)

FOREIGN PATENT DOCUMENTS

| | | | |
|---|---|---|---|
| EP | 1022704 | A1 | 7/2000 |
| EP | 2166524 | A1 | 3/2010 |

(Continued)

*Primary Examiner* — John Olszewski
*Assistant Examiner* — Navid Ziaeianmehdizadeh
(74) *Attorney, Agent, or Firm* — Alston & Bird LLP

(57) ABSTRACT

Precision traffic flow indication may involve receiving device data over a period of time representing a plurality traffic flow readings associated with a road involving a plurality of subsections. Calculating traffic flows and determining road subsections having similar traffic flows may also be involved. Also, indicating a different traffic flow level for a first subsection and a second subsection of road may be involved.

18 Claims, 8 Drawing Sheets

(56) References Cited

U.S. PATENT DOCUMENTS

| | | | | |
|---|---|---|---|---|
| 2007/0208493 | A1 | 9/2007 | Downs et al. | |
| 2007/0225894 | A1 | 9/2007 | Tsukamoto | |
| 2007/0225902 | A1 | 9/2007 | Gretton et al. | |
| 2008/0071465 | A1 | 3/2008 | Chapman et al. | |
| 2008/0140303 | A1 | 6/2008 | Hiruta et al. | |
| 2010/0211301 | A1 | 8/2010 | McClellan | |
| 2011/0161261 | A1* | 6/2011 | Wu ...................... | G08G 1/0104 706/12 |
| 2011/0310733 | A1 | 12/2011 | Tzamaloukas et al. | |
| 2012/0109506 | A1 | 5/2012 | Fei et al. | |
| 2012/0316765 | A1* | 12/2012 | Marko ................. | G08G 1/0112 701/119 |
| 2014/0100766 | A1 | 4/2014 | Masutani | |

FOREIGN PATENT DOCUMENTS

| | | | |
|---|---|---|---|
| EP | 2219167 | B1 | 1/2012 |
| EP | 2442291 | B1 | 4/2013 |
| WO | WO2005088255 | A1 | 9/2005 |
| WO | WO2008083743 | A1 | 7/2008 |
| WO | WO2011079724 | A1 | 7/2011 |
| WO | WO2011085421 | A2 | 7/2011 |

* cited by examiner

PRECISION TRAFFIC INDICATION

This application is a continuation under 37 C.F.R. § 1.53(b) and 35 U.S.C. § 120 of U.S. patent application Ser. No. 14/159,167 filed Jan. 20, 2014 which is incorporated by reference in its entirety.

FIELD

The following disclosure relates to precision traffic indication, and more specifically to indicating varying traffic conditions along a length of road using mobile device position data.

BACKGROUND

A road system may have varying traffic densities, flows, events, or conditions in different geographic positions throughout the road system. The Traffic Message Channel (TMC) addressing scheme has been devised to show traffic flows of specific designated segments of a road system. These designated segments are indexed and traffic flows are reported or indicated for the designated segments as a whole.

Traffic flows may vary throughout the length of the designated segments, but traffic flows may only be indicated or reported for an entire segment. Thus, the indicated or reported traffic flow for the designated segment may not be accurate for the entirety of the designated segment.

SUMMARY

In an embodiment, mobile device data is received over a period of time from a plurality of mobile devices associated with a length of road comprising a plurality of subsections of road. A number of mobile device readings per subsection of the length of road and a difference between traffic flow of a first and a second subsection of the length of road may be calculated from the mobile device data. A different traffic flow level for the first subsection of the length of road and the second subsection of the length of road may be indicated when the number of mobile device readings per subsection is above a probe quantity threshold and the difference between traffic flow of the first and a second subsection of the length of road is above a variance threshold.

In an embodiment, a non-transitory computer readable medium including instructions that when executed on a computer are operable to receive mobile device data over a period of time from a plurality of mobile devices associated with a length of road comprising a plurality of subsections of road. The instructions may also be operable to calculate, from the mobile device data, a number of mobile device readings per subsection of the length of road and a difference between traffic flow of a first and a second subsection of the length of road. The instructions may also be operable to indicate a different traffic flow level for the first subsection of the length of road than the second subsection of the length of road when the number of mobile device readings per subsection is above a probe quantity threshold and the difference between traffic flow of the first and a second subsection of the length of road is above a variance threshold.

In an embodiment, an apparatus may involve at least one processor, and at least one memory including computer program code. The at least one memory and the computer program code configured to, with the at least one processor, cause the apparatus at least to perform receiving device data over a period of time representing a plurality traffic flow readings associated with a length of road comprising a plurality of subsections of road. The computer program code may also be configured to cause the apparatus to calculate from the device data, a number of readings per subsection of the length of road and a difference between traffic flow of a first and a second subsection of the length of road. The computer program code may also be configured to cause the apparatus to indicate a different traffic flow level for the first subsection of the length of road than the second subsection of the length of road when the number of readings per subsection is above a probe quantity threshold and the difference between traffic flow of the first and a second subsection of the length of road is above a variance threshold.

BRIEF DESCRIPTION OF THE DRAWINGS

Exemplary embodiments of the present invention are described herein with reference to the following drawings.

DETAILED DESCRIPTION

Many travelers of road systems use the navigation capability of mobile units or devices to aid in the traversal of the road systems. This phenomenon provides a significant amount of mobile device data associated with the travelers. As travelers typically obey road system limitations, such as road direction and traffic flow restrictions, the data associated with these travelers may be indicative of traffic flows.

Mobile device data may be collected over a period of time. The collected mobile device data may also be located geographically proximate to a road segment or subsegment of a road system so as to be associable with the road. This data collection may provide a significant amount of mobile device movement information as it relates to traffic flow for the road. Mobile device data collected over a recent period of time may be analyzed indicate the recent or real-time traffic conditions or flow for the road. Further analyzing this data at an associated sub-segment level of road to determine if traffic flows vary over a segment may provide for an accurate characterization of the traffic over an entire segment. An analysis may be performed on the mobile device data, and characteristics of the traffic flow of subsegments may be calculated. These characteristics may indicate that different traffic flows or flow levels should be indicated for different subsegments of a segment or length of road.

The different indication of traffic flow levels for different traffic flow levels may be indicated to a user of a mobile device, such as a device described below with respect to FIG. 5. The user may be provided a visible representation of the traffic levels. Different graphics may be used for different traffic levels. For example by presenting the segment or length of road with subsegments having different traffic flow levels in different colors, instead of a singular color for the entire segment or length of road. A user may then use this more accurate traffic level information to plan a route through a road system, or modify a current route through a road system.

Figure 1A:
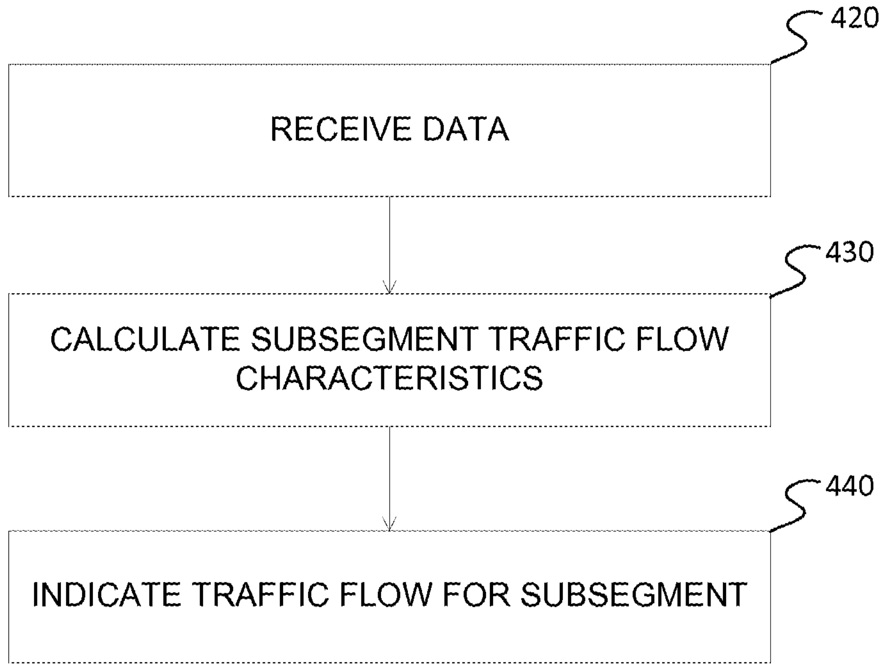
FIG. 1A illustrates an example embodiment for precision traffic indication.

FIG. 1A illustrates an example embodiment for precision traffic indication. As presented in the following sections, the steps may be performed using any combination of the components indicated in FIG. 4, FIG. 5, or FIG. 6. For example the term controller may refer to either controller 200 of or processor 300 and the following acts may be performed by mobile device 122, server 125, or a combination thereof. Additional, different, or fewer acts may be provided. The acts are performed in the order shown or other orders. The acts may also be repeated.

In act 420 data is collected over a period of time relating to traffic on a length of road. The data may be any type of data, such as mobile device data, static device data, or any combination of these. In an embodiment, mobile device data is collected over a period of time from a plurality of mobile devices associated with a length of road having a plurality of subsections of road. Mobile device data may be associated with vehicles, or roads. Associating mobile device data with a road may involve position data that indicates the mobile device is within a certain distance of the road. The period of time may be a number of minutes, hours, days, or any period of time sufficient to provide enough mobile device data to be analyzed. In an embodiment, the period of time is a recent period of time selected to indicate present or real-time data relating to the length of road. For example, the length of time may be five minutes. A time may be included in the mobile device data.

The mobile device data may be any mobile device data indicative of traffic conditions or flow levels. For example, the mobile device data may include location data, velocity data, direction of travel data, time data, or any other data originating from a mobile device such as the mobile device described below with respect to FIG. 5.

The mobile device data may be associated, or presumed to be associated, with vehicles traveling a road system on the length of road. In an embodiment, a road may involve multi-directional or opposing traffic flows. As such, each direction of traffic flow for a physical road structure may be considered an independent length of road as referenced herein. In an embodiment, mobile device data associated with vehicles is distinguished from mobile device data associated with pedestrians. This distinction may be performed based on a type of mobile device that the data originated from, the type of data that is received, or an identifier included in the mobile device data that indicates the association of the data.

Static device data may involve a device configured to measure velocities of vehicles as they pass the device. For example, the static device may be a computer device as described below with respect to FIGS. 4-6 that also includes an input device, such as Doppler radar enabled hardware, capable of measuring the velocity of a vehicle or multiple vehicles over time. Associating this device with a specific geographic location may also associate the data acquired with this device to be associated with a road corresponding to the geographic location.

In an embodiment, static device data and mobile device data may be combined to provide a number of readings related to traffic conditions or flows for a road. For example, the mobile device data and the static device data may provide velocity values for a number of vehicles over a period of time. These velocity values may be used together to indicate traffic conditions.

The length of road may be any length of road. In an embodiment, the length of road correlates to a designated length of road designated and indexed as a reporting location of a Traffic Message Channel (TMC) addressing scheme. TMC is a technology for delivering traffic and travel information to motor vehicle drivers. It is digitally coded, using the Radio Data System on conventional FM radio broadcasts. It can also be transmitted on Digital Audio Broadcasting or satellite radio. TMC allows silent delivery of dynamic information suitable for reproduction or display in a user's language without interrupting audio broadcast services. Both public and commercial services are operational in many countries. When data is integrated directly into a navigation system, traffic information can be used in the system's route calculation and road system display to inform a user of the traffic conditions or flow levels of designated segments or lengths of road. In an embodiment, the length of road may be a length of road represented by a road system as described in FIG. 1B.

The subsegments of the length of road may be any length less than the whole of the length of road. In an embodiment, a TMC designated length of road has subsegments that when added together equal the entirety of the TMC designated length of road. For example, the length of road may be represented in a geographic database as a collection of road segments or subsegments connected by nodes. These sub-lengths of the total length of road may be considered subsegments.

In act 430 traffic flow characteristics of subsegments of the length of road are calculated. The characteristics may be calculated using the mobile device data, stationary device data measuring traffic characteristics, historical collected data of traffic, or any combination of these. In an embodiment, only mobile device data is used to calculate the traffic flow characteristics.

Traffic flow characteristics may be any characteristic indicative of traffic flow or relative traffic flow as compared to other subsections of road. For example, traffic flow characteristics may involve a number of mobile devices providing data, mobile device velocities, mobile device velocity differences between subsegments, traffic flow rates, and/or traffic flow or velocity reading error values.

In act 440 traffic flows for each subsegment are indicated. Different traffic flows between subsegments may be indicated when the traffic flow characteristics of the subsegments indicate that there are different traffic flow levels on different subsegments. For example, an average velocity value may differ between subsegments. When this difference reaches a level determined to indicate a different traffic flow between the subsegments, different traffic flows may be indicated for different subsegments. Additional or different characteristics may be used for traffic flow level difference determinations. In an embodiment, a certain number of mobile devices providing data for a subsegment may be required to indicate different traffic flow levels.

Figure 1B:
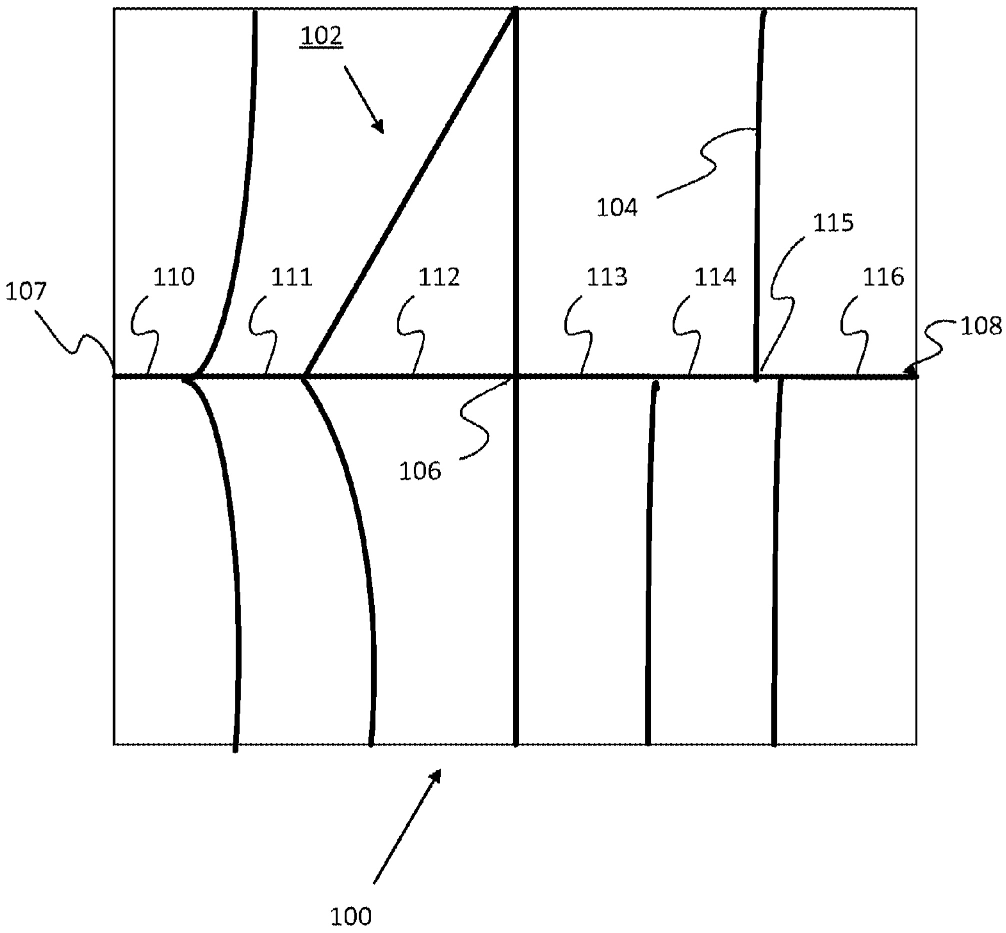
FIG. 1B is diagram illustrating a road system of a geographic region.

In an embodiment, the length of road is a part of a road system for a geographic region 100, as illustrated by FIG. 1B. The region 100 may be a country (e.g., France), state (e.g., Illinois), province, city (e.g., Chicago), metropolitan area (e.g., the New York metropolitan area), county (e.g., Cook County, Ill.), any other municipal entity, or any other area of comparable or different size. Alternatively, the geographic region 100 may be a combination of one or more countries, states, cities, metropolitan areas, and so on. The region 100 may also represent locations without reference to geo-political boundaries, such as being a rectangular regions centered on or relative to a particular point or location. The region 100 includes a road network 102. The road network 102 may include, among other things, a plurality of road segments 104 connected at intersections 106 throughout the region 100. Though not depicted herein, the region 100 may also include one or more points of interest, such as businesses, municipal entities, tourist attractions, and/or other points of interest, one or more topographical features (e.g., ponds, lakes, mountains, hills, etc.) of the geographic region 100, pedestrian network having sidewalks and pedestrian paths, a bicycle network having bike paths, bike lanes on road segments, and/or road segments appropriate for bicycle travel, and/or a public transit network including, for example, railroads, public bus lines, tourist bus lines, metro railway lines (e.g., subways and elevated lines), light rail (e.g., trams, trolleys, or street cars), water taxi, and stations and/or stops for one or more of each. The region 100 may include other networks, features, and/or points as well. In an embodiment, a length of road as defined between a first node 107 and a second node 108 of the road system may involve multiple subsegments of road 110, 111, 112, 113, 114, 115, 116.

Figure 2:
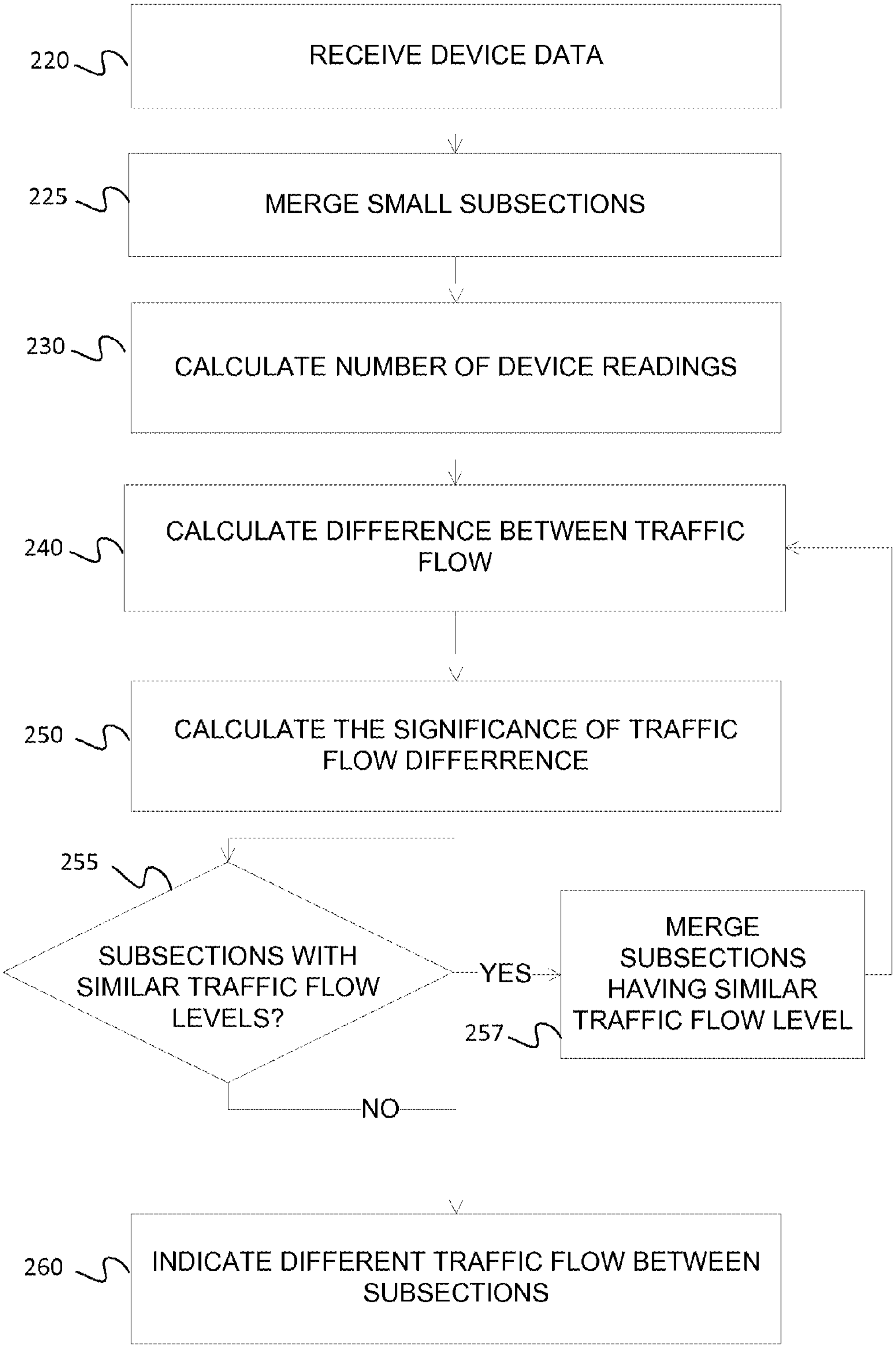
FIG. 2 illustrates another example embodiment for precision traffic indication.

FIG. 2 illustrates an example embodiment for precision traffic indication.

In act 220, device data is received over a period of time. The device data may involve data relating to traffic on a road such as velocities of vehicles on the road. In an embodiment, the device data is mobile device data from a plurality of mobile devices associated with a length of road having a plurality of subsections of road.

In an embodiment, subsections of road may be composite subsections of road that involve a combination of subsections of road. For example, as indicated in act 225 subsections of road that are determined to be to short or small may be merged into neighboring subsections to form composite subsections. In an embodiment, subsections may be considered too short if the length of the subsection is less than a length threshold. For example, a length threshold may be 20 meters, and subsections having lengths less than 20 meters are merged with other subsections. Composite subsections may be considered a singular subsection for subsequent calculations and determinations as described below, and as such may group data associated with all the subsections of the composite subsection for those calculations or determinations.

In act 230, a number of device readings is calculated. The number of device readings may be a number of mobile devices providing data relating to traffic along the subsections of the length of road. The number of device readings may also be a total number of readings provided from a combination of static and mobile devices for each subsection.

In act 240, a difference between traffic flows of subsections may be calculated. In an embodiment, a difference between traffic flow of a first and a second subsection of the length of road is calculated. In an embodiment, the traffic flows, and ultimately the traffic flow differences, are calculated using the data received in act 220. For example, received mobile device data may be used to calculate traffic flow differences.

A traffic flow may be calculated for subsections of road using any technique operable to provide a value or level of traffic flow. For example, traffic flow may be indicated by average speed of vehicles, a number of vehicles per period of time, or any other measure indicative of traffic flow. The traffic flow difference may then be calculated as a difference between the traffic flow values or levels of different subsections.

In an embodiment, the traffic flow may be determined as a jam factor. For example, the traffic flow may be calculated using Equation 1.

$$F = \frac{S_{observed}}{S_{free\ flow}} \qquad \text{Equation 1}$$

In Equation 1, F is the traffic flow for a subsection, $S_{observed}$ is an average speed for a subsection determined using the mobile device data, and $S_{free\ flow}$ is an expected speed of vehicles in free flow traffic conditions for the subsection, for example when there are very low traffic levels on the subsection. A traffic flow difference may then be determined by taking a traffic flow for one section and subtracting the traffic flow of another subsection. The absolute value of the subtracted result may be considered a traffic flow difference between the two subsections.

In act 250, a significance of the traffic flow differences between the subsections of the road. The significance of the traffic flow differences may indicate a reliability or error of the received device data. The significance may be determined by any technique.

In an embodiment, a speed determination error for a subsection may be determined. In an embodiment, a speed determination error may be determined using Equation 4.

$$S_{error} = \frac{\sigma}{\sqrt{N}} \qquad \text{Equation 2}$$

In Equation 2, $S_{error}$ is the speed determination error for a subsection, σ is a standard deviation of the number of speed values for a subsection, and N is the number of speed values for a subsection.

In an embodiment, a traffic flow difference error for subsections may be calculated using Equation 3.

$$E_F = \frac{\left(\frac{\sigma}{\sqrt{N}}\right)}{S_{free\ flow}} \qquad \text{Equation 3}$$

In Equation 3, $E_F$ is an error of the traffic flow determination for a segment, a is a standard deviation of the number of speed values for a subsection, N is the number of speed values for a subsection, and $S_{free\ flow}$ is an expected speed of vehicles in free flow traffic conditions of the subsection.

In an embodiment, a traffic flow difference significance may be determined using Equation 4.

$$T = \frac{\Delta F_{1-2}}{\sqrt{E_{F1}^2 + E_{F2}^2}} \qquad \text{Equation 4}$$

In Equation 4, T is the traffic flow difference significance between subsections, $\Delta F_{1-2}$ is the difference in traffic flows between a subsection 1 and a subsection 2, and $E_{F1}$ is an error of the traffic flow determination for segment 1. The error of the traffic flow determination may be determined using any method. For example, the error of the traffic flow determination may be the standard error, such as a standard deviation, of individual values used for the traffic flow determination of a subsection.

In an embodiment, an iterative subsection comparison may be performed using composite subsections. For example, as indicated in act 255 a decision may be made regarding whether traffic flows between subsections are similar. Subsection traffic flow similarities may be determined using any technique. In an embodiment, subsection traffic flow similarities may be determined using the traffic flow difference calculated in act 240 and/or the traffic flow difference significance calculated in act 250. Traffic flow differences and/or traffic flow difference significances may be compared to thresholds to determine subsection similarities. For example, if the traffic flow difference between two subsections is below a variance threshold value, the two subsections may be considered to have similar traffic flows. The traffic flow difference significance may also be compared to a threshold to determine whether traffic flows of the two segments are similar. For example, when the traffic flow difference significance between two subsections is below a significance threshold, the two subsections may be considered to have similar traffic flow levels.

Other values and/or measures may also be used to determine traffic flow levels. For example, an average speed of vehicles on a subsection of road may be used. Speeds or velocities of vehicles may be measured directly. Also, travel times may be used. For example, positions of mobile devices may be tracked along a road, and a speed for a subsection may be determined by dividing a length of the subsection by the time required for the mobile device to travel a subsection.

In act 257, subsections determined to have similar traffic flow levels may be merged into composite subsections. The merged subsections may be composite subsections that had been previously merged, or independent subsections that has yet to be merged with other subsections. Further, composite subsections may also be merged to form other composite subsections. Subsequent calculations and comparisons regarding traffic flow of the composite subsections may be performed after composite subsection creation.

Calculated or determined values for composite subsections may be determined by any technique capable of representing the values for the composite subsections. In an embodiment, the data acquired for each individual subsection may be aggregated into a singular set of data for the composite subsection. For example, a speed for a composite subsection may be determined by a total length of all the individual subsections of the composite subsection divided by the average time for a mobile device to travel the length. Also, the values determined for each individual subsection of the composite subsection may be used in combination. For example, when calculating an error in speed determination, which may be used for a traffic flow difference significance determination, a general error propagation technique may be used for speeds determined for each subsection of the composite subsection. In such an instance, if the standard error is used to determine the error of the measurements, as is indicated above with respect to act 250, travel time measurement error propagation determination for a composite subsection may take the form of Equation 5.

$$t_{1\text{-}n\ composite\text{-}error}=\sqrt{t_{1\text{-}error}{}^2+t_{2\text{-}error}{}^2+\ldots t_{n\text{-}error}{}^2} \quad \text{Equation 5:}$$

In Equation 5, $t_{1\text{-}n\ composite\text{-}error}$ is the travel time error for a composite subsection that includes subsections 1-n, and $t_{n\text{-}error}$ is the error of the travel time determined to travel subsection n. $t_{n\text{-}error}$ may be determined using equation 6.

$$t_{n-error} = S_{n-error}\left(\frac{l_n}{S_n^2}\right) \quad \text{Equation 6}$$

In Equation 6, $S_{n\text{-}error}$ is the speed error for a subsection, $S_n$ is the speed determined for the subsection, and $l_n$ is a length of the subsection.

Using the travel time error for a composite subsection, a speed error for the composite subsection may be determined using Equation 7.

$$S_{1-n\ composite-error} = t_{1-n\ composite-error}\left(\frac{l_{1-n\ composite}}{t_{1-n\ composite}^2}\right) \quad \text{Equation 7}$$

In Equation 7, $S_{1\text{-}n\ composite\text{-}error}$ is the speed error for a composite subsection that includes subsections 1-n, $t_{1\text{-}n\ composite}$ is the travel time for the composite subsection, $l_{1\text{-}n\ composite}$ is a length of the composite subsection, and $t_{1\text{-}n\ composite\text{-}error}$ is the travel time error for a composite subsection.

In act 260, different traffic flow levels for subsections of road are indicated. Different traffic flow levels may be indicated when the device data indicates that there are different traffic flow levels between subsections of road.

In an embodiment, a different traffic flow level for the first subsection of the length of road than the second subsection of the length of road when the number of mobile device readings per subsection is above a probe quantity threshold and the difference between traffic flow of the first and a second subsection of the length of road is above a variance threshold. For example, a probe quantity threshold may be 2, a variance threshold may be 0.2.

In an embodiment, traffic flow levels are indicated using a plateaued threshold reporting scheme. For example, a series of traffic flow thresholds may be established such that a traffic flow value for a subsection falls into a category defined by traffic flow threshold category boundaries. Each traffic threshold category may be indicated differently. For example, a subsection having a high traffic level category may be presented to a user differently than a subsection having a low traffic level category. Any indication that differentiates the traffic flow levels between subsections may be used. In an embodiment, colors may be used for characterizations of traffic flow, and indicating the different traffic flow level comprises using different colors for a first subsection and a second subsection. Varying patterns or other indications may also be used to indicate different traffic levels for subsections. In an embodiment, a jam factor may be used to determine values for traffic level categories. For example, a heavy traffic category may have a jam factor value between 0 and 0.030. A moderately heavy traffic category may have a jam factor value between 0.030 and 0.330. A moderate traffic category may have a jam factor between 0.330 and 0.727, and a light or free flow traffic category may have a jam factor between 0.727 and 1.0.

Figure 3A:
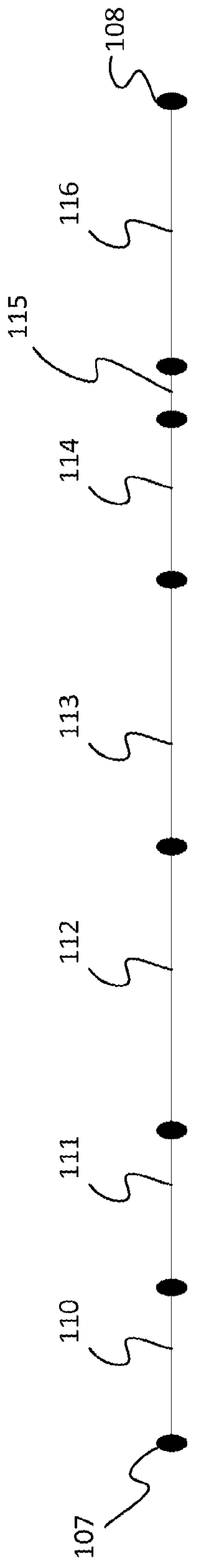
FIGS. 3A-D illustrate an exemplary length of road for indicating traffic flows.
Figure 3B:
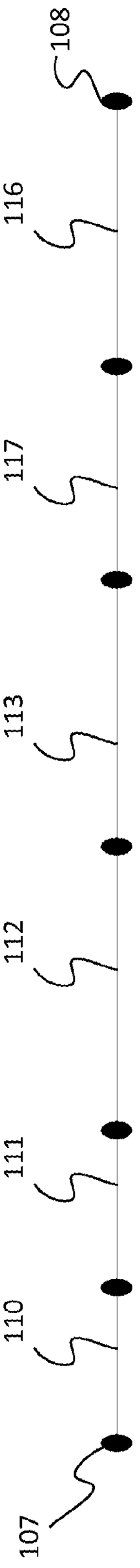
Figure 3C:
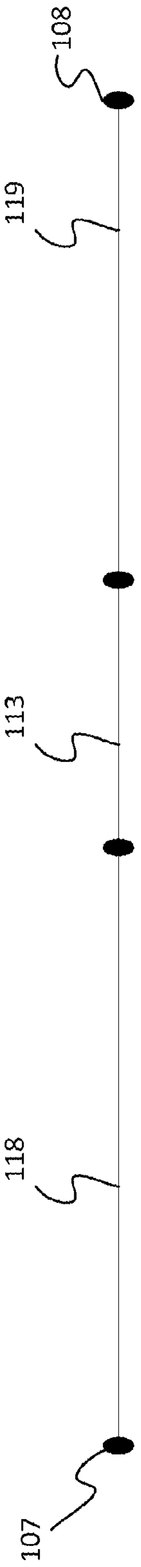
Figure 3D:
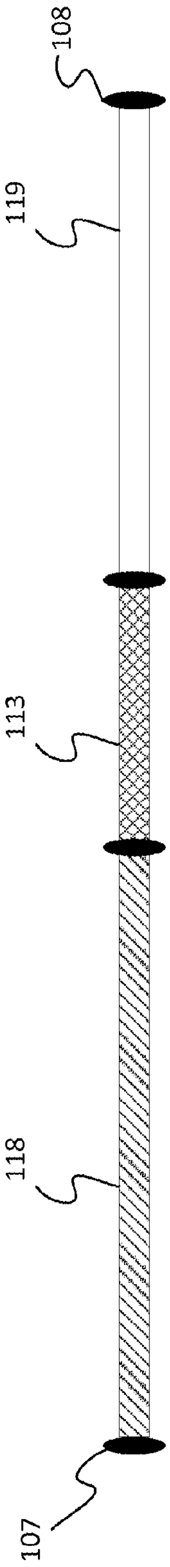

FIGS. 3A-D illustrate an exemplary length of road for indicating traffic flows. FIG. 3A illustrates a length of road as indicated in the geographic area 100 of FIG. 1B. The length of road is defined by two bounding end nodes 107, 108. In an embodiment, the length of road may be a TMC established length of a road for reporting traffic levels. The length of road involves multiple subsections or subsegments 110, 111, 112, 113, 114, 115, 116. These subsections 110, 111, 112, 113, 114, 115, 116 may be areas of road represented as road segments or links of a geographic database. In an embodiment a subsection 115 may be considered to be a length that is too small. The small subsection 115 may be merged with another subsection 114 to create a composite subsection 117 as indicated in FIG. 3B. As depicted in FIG. 3C, different subsections 110, 111, 112 and 116, 117 may be found to have similar traffic flow levels, for example as described with respect to FIG. 2, and may also be merged into composite subsections 118, 119. The resulting or remaining subsections 113, 118, 119 may be provided to a user such that a display indicates that there are different traffic levels for the subsections 113, 118, 119, as is shown in FIG. 3D. For example, the diagonal line pattern for a subsection 118 may indicate moderate levels of traffic, a hatched pattern for a subsection 113 may indicate heavy levels of traffic, and no pattern displayed with a subsection 119 may indicate traffic at free flow levels for the subsection 119.

Figure 4:
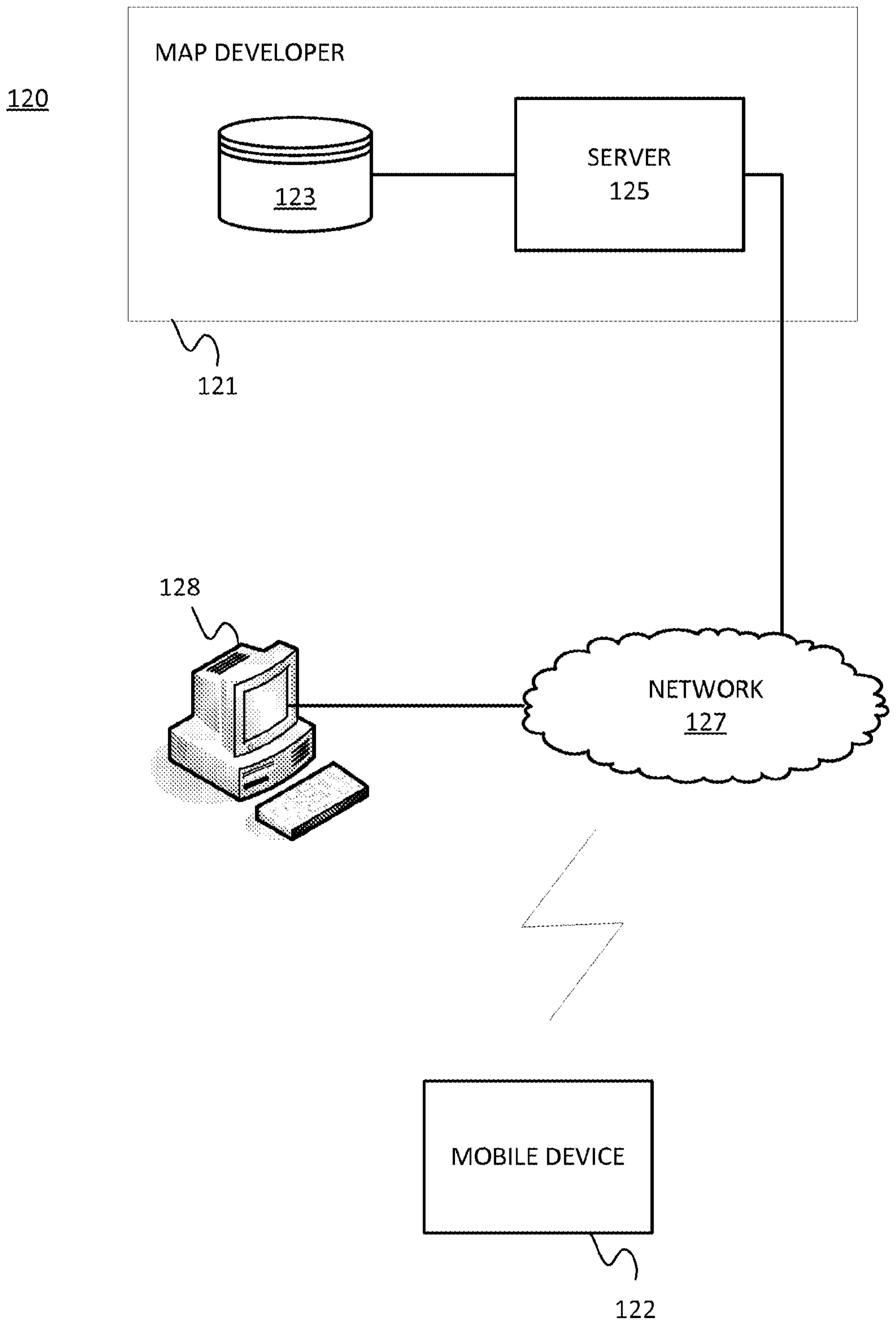
FIG. 4 illustrates an exemplary geographic or navigation system.

FIG. 4 illustrates an exemplary geographic or navigation system 120. The geographic or navigation system 120 includes a map developer system 121, a mobile device 122, and a network 127. Additional, different, or fewer components may be provided. For example, many mobile devices 122 may connect with the network 127.

The developer system 121 includes a server 125 and a database 123. The developer system 121 may include computer systems and networks of a system operator such as NAVTEQ or Nokia Corporation. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structure cartographic data or pedestrian routes.

The mobile device 122 may include one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122. The mobile device 122 may also include a system for tracking mobile device movement, such as rotation, velocity, or acceleration. Movement information may also be determined using the positioning system.

The mobile device 122 may communicate location and movement information via the network 127 to the server 125. The server 125 may use the location and movement information received from the mobile device 122 to associate the mobile device 122 with a geographic region, or a road of a geographic region, described in the geographic database 123. Server 125 may also associate the mobile device 122 with a geographic region, or a road of a geographic region, manually.

The server 125 may receive location and movement information from multiple mobile devices 122 over the network 127. The location and movement information may be in the form of mobile device data. The server 124 may compare the mobile device data with data of a road system stored in the database 123. The server 125 may determine different traffic flows for different segments of a road, and provide an indication of these different traffic flows.

The computing resources for indicating traffic flows may be divided between the server 125 and the mobile device 122. In some embodiments, the server 125 performs a majority of the processing. In other embodiments, the mobile device 122 performs a majority of the processing. In addition, the processing is divided substantially evenly between the server 125 and the mobile device 122.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 5:
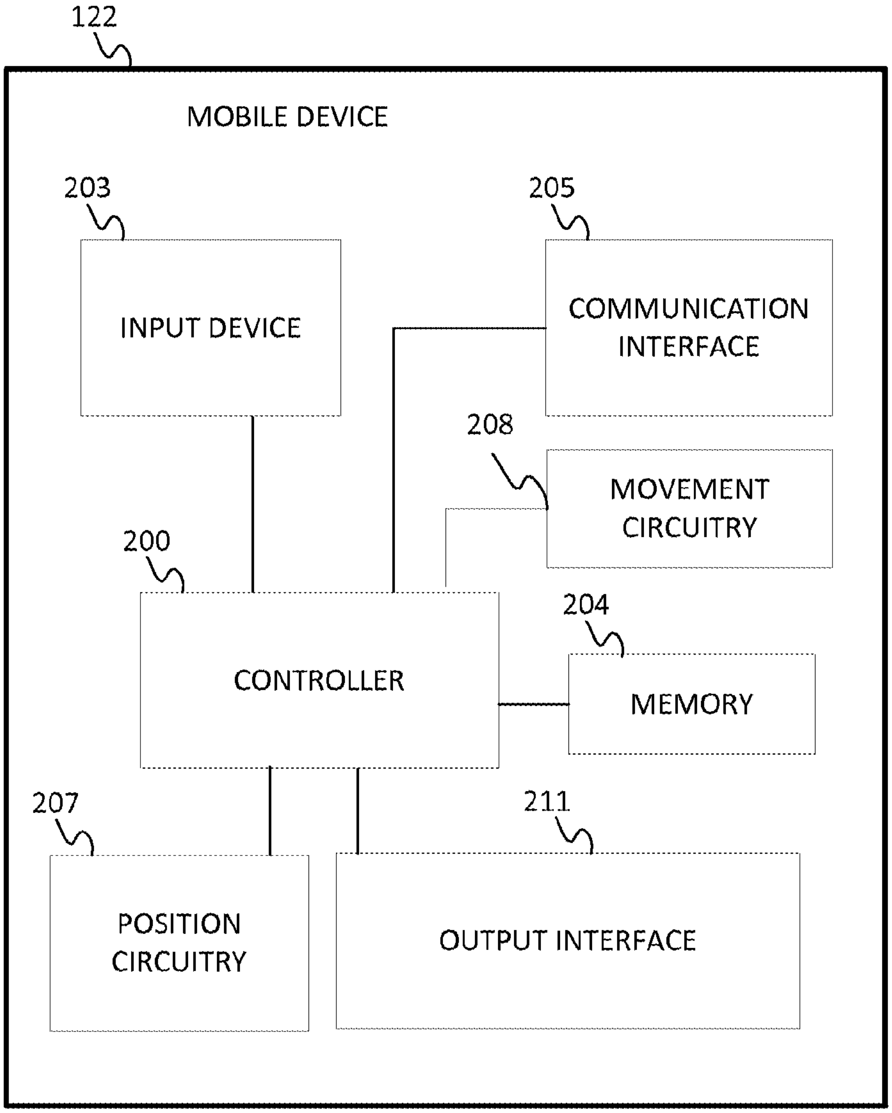
FIG. 5 illustrates an exemplary mobile device of the geographic or navigation system of FIG. 4.

FIG. 5 illustrates an exemplary mobile device of the geographic or navigation system of FIG. 4. The mobile device 122 may be referred to as a navigation device. The mobile device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a mobile device, or the mobile device may be integrated into a vehicle. The positioning circuitry 207, which is an example of a positioning system, is configured to determine a geographic position of the mobile device 122. The movement circuitry 208, which is an example a movement tracking system, is configured to determine movement of a mobile device 122. The position circuitry 207 and the movement circuitry 208 may be separate systems, or segments of the same positioning or movement circuitry system. In an embodiment, components as described herein with respect to the mobile device 122 may be implemented as a static device. For example, such a device may not include movement circuitry 208, but may involve a traffic or speed detecting input device 203 such as a Doppler radar velocity detector or a contact sensing traffic volume measurement apparatus.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The movement circuitry 208 may include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device. The movement circuitry 208 may be used alone, or with the positioning circuitry 207 to determine mobile device 122 movement.

Positioning and movement data obtained from a mobile device may be considered geographic data, device data, and/or mobile device data.

The input device 203 may be one or more buttons, keypad, keyboard, mouse, stylist pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The communication interface 205 is configured to send mobile device movement and position data to a server 125. The movement and position data sent to the server 125 may be used to determine traffic flows for a road and subsections of the road. The communication interface 205 may also be configured to receive data indicative of an indication of different traffic flows between road subsections. The position circuitry 207 is configured to determine the current location of the mobile device. The controller 200 may be configured to determine a calculate traffic flows and traffic flow significances. The controller 200 may also be configured to determine a visual indication to a display that represents differing traffic flows between road subsections. The output interface 211 may be configured to present a visual indication of the differing traffic flows between road subsections to a user of the mobile device 122. The output interface 211 may also be configured to present directions incorporating the differing traffic flows between road subsections.

Figure 6:
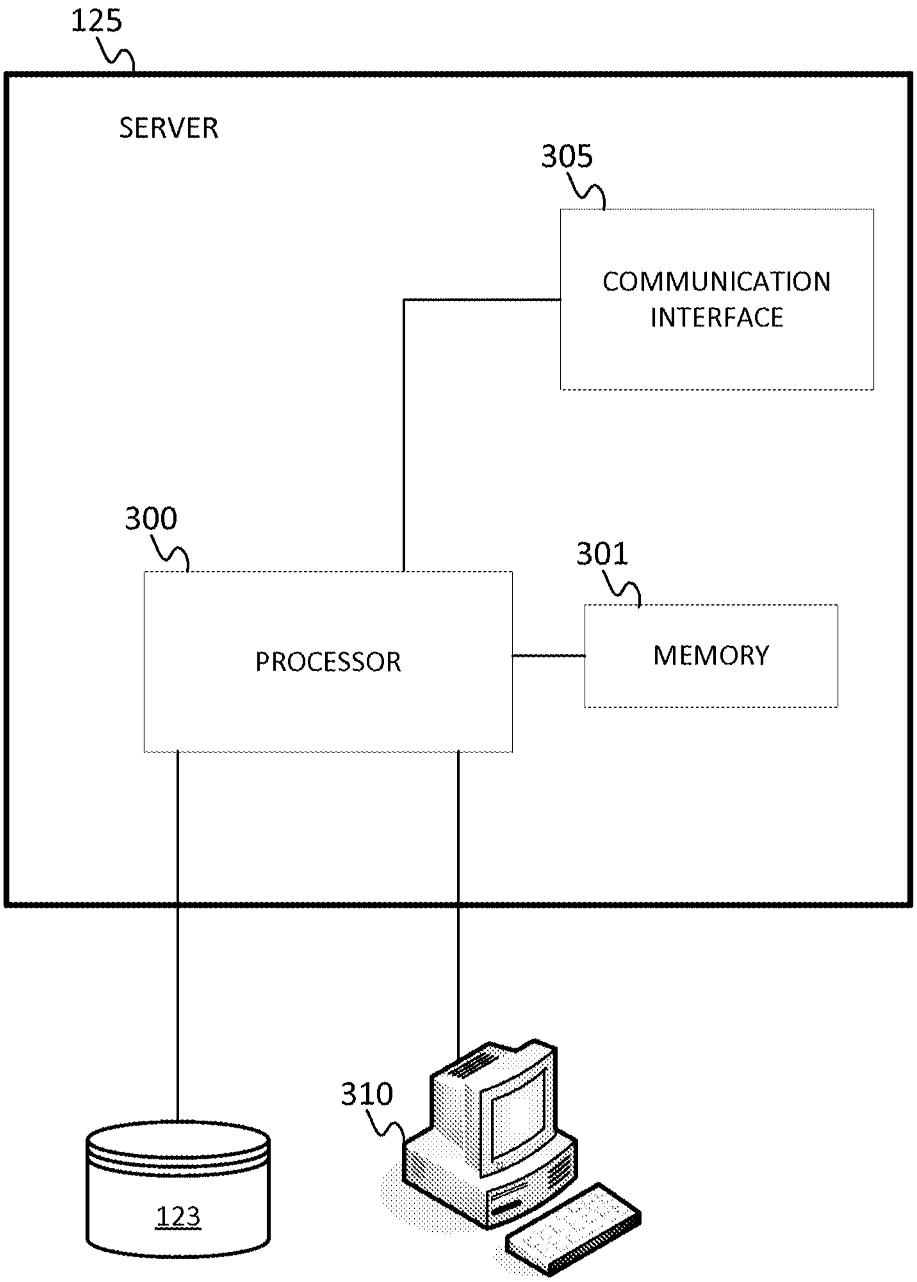
FIG. 6 illustrates an exemplary server of the geographic or navigation system of FIG. 4.

FIG. 6 illustrates an exemplary server of the geographic or navigation system of FIG. 4. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 may receive data indicative of use inputs made via the mobile device 122.

The communication interface 305 is configured to receive mobile device data representing locations and movements of a plurality of mobile devices 122. The processor 300 may be configured to calculate traffic flows for subsections of road. In an embodiment, the processor 300 is configured to calculate traffic flow differences between subsections of road as well as traffic flow difference significances between different subsections of road. As such, the processor 300 is configured to determine road subsections having similar traffic flows, and to generate a visual indication for traffic flows that are different between subsections. The visual indication of the differing traffic flows may be direction of travel dependent.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In an embodiment, the set of instructions may involve receiving mobile device data over a period of time from a plurality of mobile devices associated with a length of road comprising a plurality of subsections of road. The instructions may also involve calculating a number of mobile device readings per subsection of the length of road from the mobile device data and a difference between traffic flow of a first and a second subsection of the length of road. The instructions may also involve indicating a different traffic flow level for the first subsection of the length of road than the second subsection of the length of road when the number of mobile device readings per subsection is above a probe quantity threshold and the difference between traffic flow of the first and a second subsection of the length of road is above a variance threshold.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method comprising:

receiving probe data for a traffic message channel (TMC) designated length of road comprising a plurality of road segments;

receiving an indication, based on the probe data, that a jam factor along the TMC designated length of road satisfies a variance threshold, wherein the jam factor is a ratio of an observed speed on the TMC designated length of road relative to a free flow speed on the TMC designated length of road;

identifying a first subsection of the TMC designated length of road and a second subsection of the TMC designated length of road from the TMC designated length of road, wherein the first subsection and the second subsection each comprise one or more road segments, wherein the first subsection and the second subsection are identified, based at least in part, on a jam factor along the road segments of the respective subsection being within a predefined degree of similarity, wherein the first subsection of the TMC designated length of road or the second subsection of the TMC designated length of road comprises a composite subsection of more than one road segment in response to at least one road segment of the composite subsection having a length failing to satisfy a length threshold;

calculating, using a processor, a first jam factor for the first subsection and a second jam factor for the second subsection;

calculating, using the processor, a traffic flow difference based on the first jam factor for the first subsection and the second jam factor for the second subsection;

modifying, using the processor, the TMC designated length of road in response to the traffic flow difference; and storing a composite road segment having the modified TMC designated length in a geographic database.

2. The method of claim 1, further comprising:

calculating, using the processor, a traffic flow significance based on an error or reliability of the probe data for the first subsection of road or the second subsection of road.

3. The method of claim 2, wherein the error or reliability of the probe data for the first subsection of road or the second subsection of road is a function of a corresponding free flow speed.

4. The method of claim 2, wherein the TMC designated length of road is modified according to the traffic flow significance.

5. The method of claim 1, further comprising:

providing a navigation related application using the composite road segment having the modified TMC designated length.

6. The method of claim 5, wherein the navigation related application indicates a single traffic flow level for the modified TMC designated length.

7. The method of claim 1, wherein the navigation related application provides routing based on the modified TMC designated length.

8. The method of claim 1, further comprising:

receiving a digitally encoded radio broadcast defining the TMC designated length of road.

9. The method of claim 1, wherein receiving the probe data comprises:

receiving real time data from a plurality of mobile devices, wherein the first jam factor for the first subsection of road and the second jam factor for the second subsection of road are based on the real time data.

10. An apparatus comprising:

at least one processor; and at least one non-transitory memory including computer program code stored therein;

the at least one non-transitory memory and the computer program code stored therein configured to, with the at least one processor, cause the apparatus to at least:

receive probe data for a traffic message channel (TMC) designated length of road comprising a plurality of road segments;

receive an indication, based on the probe data, that a jam factor along the TMC designated length of road satisfies a variance threshold, wherein the jam factor is a ratio of an observed speed on the TMC designated length of road relative to a free flow speed on the TMC designated length of road;

identify a first subsection of the TMC designated length of road and a second subsection of the TMC designated length of road from the TMC designated length of road, wherein the first subsection and the second subsection each comprise one or more road segments, wherein the first subsection and the second subsection are identified, based at least in part, on a jam factor along the road segments of the respective subsection being within a predefined degree of similarity, wherein the first subsection of the TMC designated length of road or the second subsection of the TMC designated length of road comprises a composite subsection of more than one road segment in response to at least one road segment of the composite subsection having a length failing to satisfy a length threshold;

calculate a first jam factor for the first subsection and a second jam factor for the second subsection;

modify the TMC designated length of road to a modified road length in response to the first jam factor for the first subsection and the second jam factor for the second subsection; and store a composite road segment having the modified TMC designated length in a geographic database.

11. The apparatus of claim 10, wherein the at least one non-transitory memory and the computer program code stored therein are further configured to, with the at least one processor, cause the apparatus to at least:

calculate a traffic flow difference based on the first jam factor for the first subsection of road and the second jam factor for the second subsection of road, wherein the modified road length is based on the traffic flow difference.

12. The apparatus of claim 10, wherein the at least one non-transitory memory and the computer program code stored therein are further configured to, with the at least one processor, cause the apparatus to at least:

calculate a traffic flow significance based on an error or reliability of the first subsection of road or the second subsection of road.

13. The apparatus of claim 12, wherein the error or reliability of the first subsection of road or the second subsection of road is a function of a corresponding free flow speed.

14. The apparatus of claim 13, wherein the TMC designated length of road is modified according to the traffic flow significance.

15. The apparatus of claim 10, wherein the at least one non-transitory memory and the computer program code stored therein are further configured to, with the at least one processor, cause the apparatus to at least:

provide a navigation related application using the composite road segment having the modified TMC designated length.

16. The apparatus of claim 10, wherein the at least one non-transitory memory and the computer program code stored therein are further configured to, with the at least one processor, cause the apparatus to at least:

identify the TMC designated length of road from a digitally encoded radio broadcast.

17. A method comprising:

generating probe data for a traffic message channel (TMC) designated length of road comprising a plurality of road segments;

receiving an indication, based on the probe data, that a jam factor along the TMC designated length of road satisfies a variance threshold, wherein the jam factor is a ratio of an observed speed on the TMC designated length of road relative to a free flow speed on the TMC designated length of road;

calculating a modified length of road different from the TMC designated length of road based on a traffic flow difference based on a first jam factor for a first subsection of the TMC designated length of road and a second jam factor for a second subsection of the TMC designated length of road, wherein at least one of the first subsection and the second subsection comprises a composite subsection of more than one road segment in response to at least one road segment of the composite subsection having a length failing to satisfy a length threshold, wherein the first subsection and the second subsection are identified, based at least in part, on a jam factor along the road segments of the respective subsection being within a predefined degree of similarity of other road segments of the respective subsection;

storing the modified length of road in a geographic database; and providing a navigation related application using the modified length of road.

18. The method of claim 17, wherein the navigation related application provides a single traffic level for the first subsection of road and the second subsection of road according to the modified length of road.

* * * * *